Oct. 30, 1945.  B. N. WALLIS  2,388,197
RANGE-FINDING APPARATUS
Filed June 10, 1944  3 Sheets-Sheet 1

Inventor
Barnes Neville Wallis
BY Loyd Hall Sutton
ATTORNEY

Inventor
Barnes Neville Wallis
BY Loyd Hall Sutton
ATTORNEY

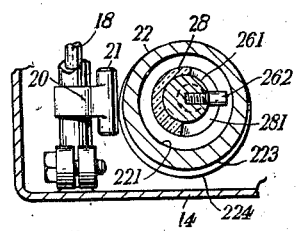
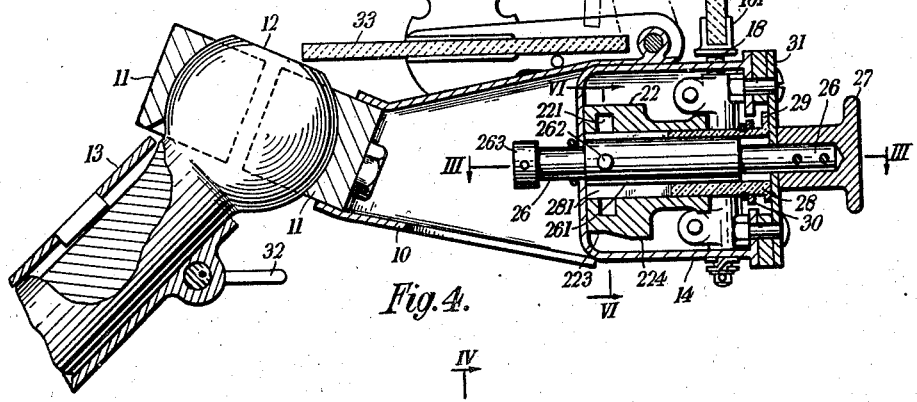
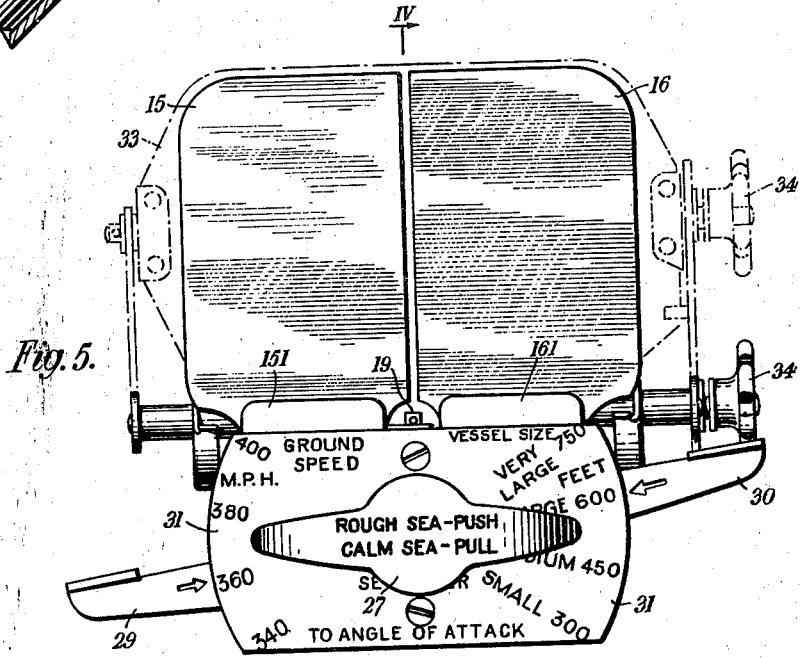

Patented Oct. 30, 1945

2,388,197

UNITED STATES PATENT OFFICE 2,388,197

RANGE-FINDING APPARATUS

Barnes Neville Wallis, Weybridge, England, assignor to Vickers-Armstrongs Limited, Westminster, London, England Application June 10, 1944, Serial No. 539,719
In Great Britain June 10, 1943

7 Claims. (Cl. 88—2.2)

The apparent distance of a target object from an observer, when viewed across an expanse of water, is deceptive, and the accurate estimation of ranges in such circumstances is a matter of some difficulty for the pilot of a torpedo-carrying aircraft, all the more so because an additional complication is introduced by the fact that the range of a target is constantly closing as the aircraft approaches at high speed. The present invention has for its object to provide an improved instrument by means of which the pilot of a torpedo-carrying aircraft, who is able to form a reasonably close estimate of (a) the size of his target, (b) the angle of inclination of the target to the line of attack, (c) the direction and speed of the target (if moving across the line of attack), (d) the speed of his own aircraft towards the target, and (e) the state of the water surface (i. e. calm, choppy or rough), may be enabled to inform himself precisely when the actual target distance coincides with the optimum range of his projectile, at which instant he should endeavour to discharge the same.

An instrument in accordance with the invention comprises two transparent reflecting screens mounted side by side and capable of individual pivotal movement in unison, though in opposite directions, about parallel axes, means for operating said transparencies so as to adjust the dihedral angle between them to a value supplementary to the known angle which is subtended at a given range at the observer's eye by an object of known dimension, and means for modifying such dihedral angle to take account of any one or more of the variable conditions hereinbefore referred to.

Figure 1:
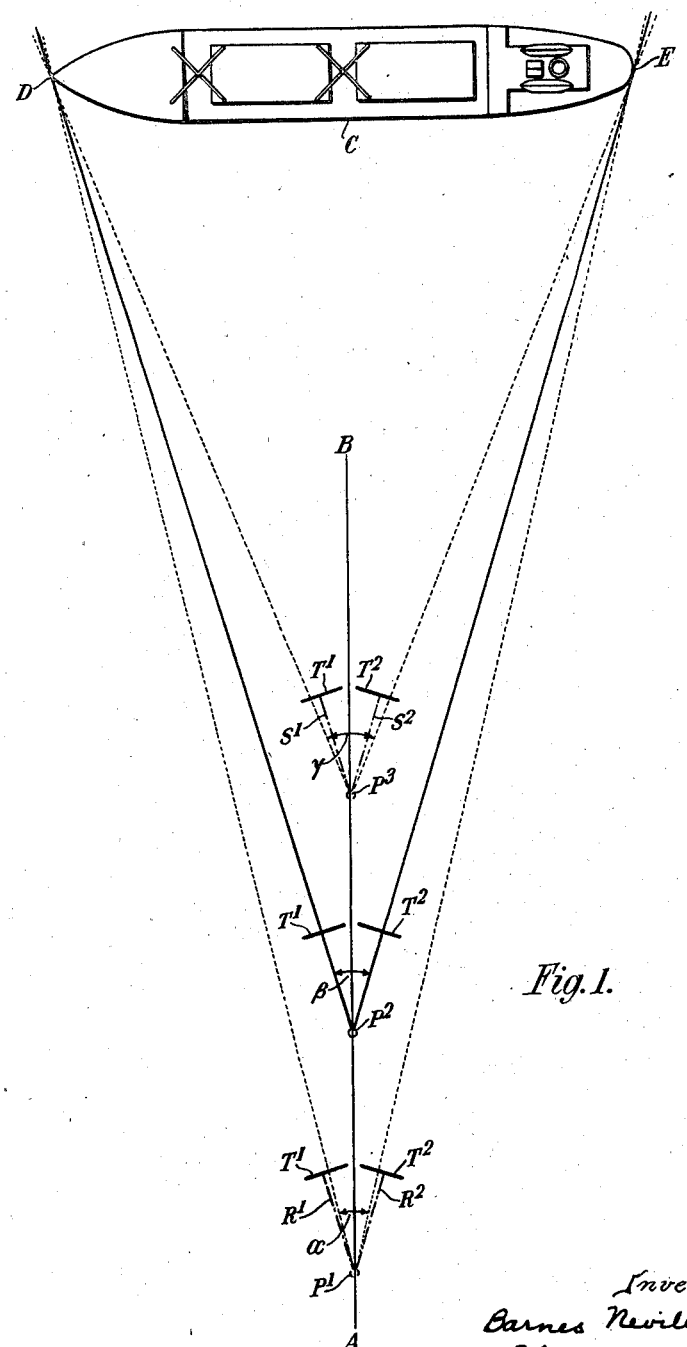

The instrument is intended to be placed in a convenient position, with a clear view through an aircraft windscreen, so that the observer or pilot may view the target through the transparent reflecting screens. The pilot is provided with a source of light (which term includes a mirror reflecting a beam from a source of light) fixed above his master-eye in such a position as to direct a beam onto each transparent reflecting screen, and it is accordingly evident, since the reflection of such source of light from each transparent reflecting screen must be normal to the plane thereof, that the two reflections will subtend at the pilot's eye an angle equal to the angle subtended by the target at the required range and under the conditions of attack which have been previously determined. When making an attack it is thus merely necessary for the observer, who has previously adjusted the transparent reflecting screens of the apparatus, to note the instant when the reflections of such light source in the two transparent reflecting screens coincide with the horizontal extremities of the target viewed through the transparent reflecting screens, and at such instant to discharge his projectile. The theoretical basis of the invention may be more easily understood by reference to the diagram contained in Figure 1 of the accompanying drawings. In this diagram the line AB represents the course of an attacking aircraft towards the target ship, a plan of which is indicated at C; the course-line AB is directly broadside to the target amidships and the extremities of the target are indicated at D and E. The points $P^1$, $P^2$ and $P^3$ respectively denote the positions of the pilot's eye at three successive instants during the attack, and it should be understood that the source of light referred to above is practically coincident in position with the eye of the pilot. The two transparent reflecting screens of the apparatus provided by the invention are indicated at $T^1$ and $T^2$. Now it will be seen that at position $P^1$ the lines along which the light-source is reflected in the transparent reflecting screens $T^1$, $T^2$ (indicated by the chain-dotted lines $R^1R^2$), include an angle larger than the angle $\alpha$ which is subtended at the pilot's eye by the extremities D, E of the target. Assuming that the dihedral angle between the transparent reflecting screens has been pre-adjusted to suit a given optimum range, taking account of such corrections as may be necessitated by the variable conditions previously referred to, it follows that position $P^1$ is too distant from the target for the attack to be made.

Coming next to position $P^2$ it is seen that the reflections of the light-source coincide with the sight-lines of the extremities of the target; in other words, the angle $\beta$ subtended at the pilot's eye by the target is supplementary to the dihedral angle between the transparent reflecting screens. This is the correct position for the attack, and the pilot should endeavour to discharge his projectile as nearly as possible simultaneously with his viewing the target extremities in alignment with the light-reflections in the transparent reflecting screens. At the position $P^3$, the lines $S^1$ and $S^2$, along which the light-source is reflected in the transparent reflecting screens, include an angle smaller than the angle $\gamma$ which is subtended at the pilot's eye by the target extremities D, E. This condition indicates that the optimum position for discharging the projectile has been passed and that the aircraft is now too close to the target for the ideal attack.

One form of apparatus constructed in accordance with the invention is hereinafter described with reference to Figs. 2 to 6 of the accompanying drawings, Fig. 2 being a plan, Fig. 3 a horizontal section on the line III—III of Fig. 4, Fig. 4 a sectional elevation on the line IV—IV of Fig. 5, Fig. 5 a front elevation and Fig. 6 a detail in section on the line VI—VI of Fig. 4.

Figure 2:
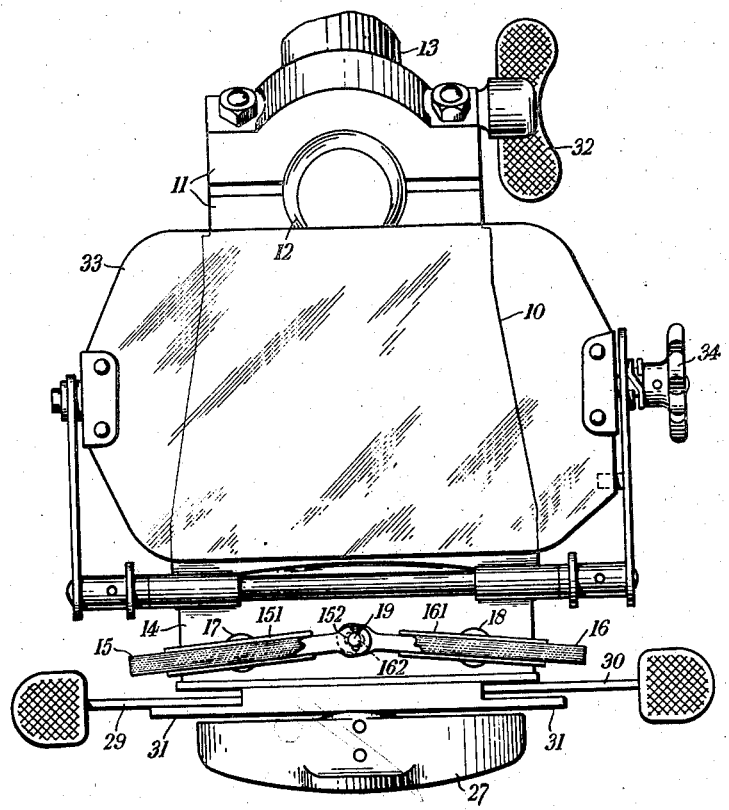
Figure 3:
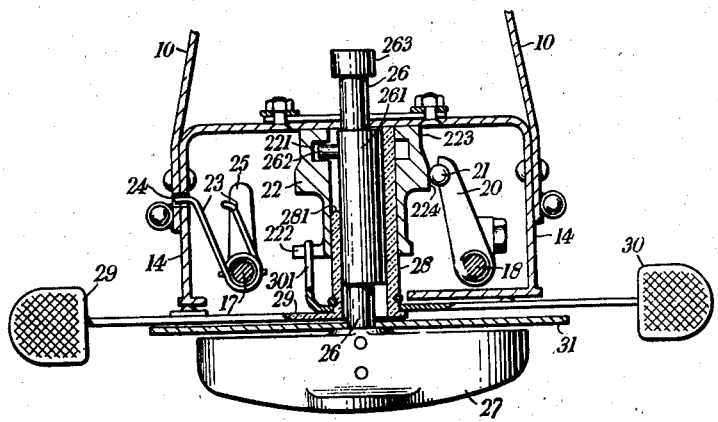

It will be seen from Figs. 2 to 6 that the apparatus comprises a bracket 10 which is capable of being mounted by means of a spherical joint 11, 12 upon a suitable support 13. The bracket 10 carries a frame or housing 14 which contains the mechanical portions of the apparatus and upon the upper side of which are mounted two optically flat panes 15, 16 of glass or other transparent material, said panes 15, 16 being capable of individual pivotal movement about a vertical axis through a few degrees on their respective pivots 17, 18. The said panes 15, 16 are supported in channel-shaped members 151, 161 which are extended towards each other so as to overlap as shown in Fig. 2. A connecting pin 19 passes through a hole 152 in the member 151 and a slot 162 in the member 161 and the arrangement is such that pivotal movement of one pane, say the pane 16, is communicated in an opposite sense and to the same degree to the other plane 15, so that the dihedral angle between said panes is increased or diminished symmetrically with respect to the central fore and aft axis of the apparatus. The movement of the panes 15, 16 is effected through the medium of a lever 20 fixed to the pivot 18 of the pane 16, said lever 20 carrying at its extremity a cam-follower 21 which cooperates with the surface of a rotary cam 22. The movement of the lever 20 in a clockwise direction (as viewed in Fig. 3) has the effect of decreasing the dihedral angle between the panes; the return movement is achieved by means of a helical spring 23 which is anchored at 24 on the housing 14, and which bears against a lever 25 fixed on the pivot 17 of the pane 15 so as to urge the panes 15, 16 towards the position in which their dihedral angle is largest.

The various adjustments of the dihedral angle between the panes 15, 16, which are necessary to take account of different target sizes, different angles of inclination of the target to the line of attack, different directions and speeds of the target (if moving across the line of attack), different speeds of the attacking aircraft and different water surface conditions, are effected through the medium of a series of eccentrics and cams the operation whereof actuates the pane 16 through the lever 20. The mechanism comprises an inner spindle 26 which is rotatably mounted in the front and rear walls of the housing 14, and which bears a knob 27 on its foremost extremity. Upon an eccentric sheave-portion 261 of the spindle 26 is rotatably mounted an eccentrically bored sleeve 28, carrying at its foremost extremity a lever or finger-piece 29 which projects laterally at the left-hand side of the instrument. The sleeve 28 in turn carries the cam 22 hereinbefore referred to which is rotatable on the sleeve 28 and which is provided with a cannelure 221 which cooperates with a peg 262 on the spindle 26 in such manner that on endwise movement of the latter a corresponding axial movement may be communicated to said cam 22. The sleeve 28 is cut away at 281 to accommodate the movement of said peg 262 both axially and to some extent circumferentially in relation thereto. The cam 22 may be operated independently by means of a lever or finger-piece 30 which is pivoted on the sleeve 28, an off-set 301 on said lever 30 being arranged to cooperate with a bifurcated lug on the cam 22, one arm of which lug is indicated at 222 in Fig. 3, in such manner that pivotal movements of said lever 30 are communicated to the cam 22. It will be seen that the cam 22 is provided with two operative faces, respectively indicated at 223 and 224; either of these faces may be brought into operative relationship with the cam-follower 21 of the lever 20 by pushing or pulling the spindle 26 endwise in relation to the housing 14, the extent of such endwise movement being limited in one direction by the abutment of the knob 27 against the face-plate 31 (hereinafter referred to) and in the other direction by the abutment of the collar 263 against the back of the housing 14.

The angle which will be subtended by a target object at the observer's eye at a known range being exactly calculable, it is necessary to provide a primary adjustment of the panes 15, 16 for the purpose of setting them initially at a dihedral angle supplementary to the known angle which will be subtended by a target of known size (i. e. horizontal dimension) at the intended range. This is effected by rotating the cam 22 by means of the lever 30. As will be seen from Fig. 5, said lever 30 is arranged to register with one of a plurality of calibrated target sizes marked on the face-plate 31. The position of the lever 30 illustrated in Fig. 5 is appropriate to a target ship of 600 feet overall length. The lever 30 should be raised to suit a larger target and depressed in the case of a target of smaller horizontal dimensions.

Where the effective range of the missile is dependent upon the state of the water surface, so that choppy or rough conditions have the effect of decreasing the range as compared with a calm surface, a secondary adjustment of the cam 22 may be effected by using either of the two faces 223, 224 thereof, the appropriate one of these being selected by pushing in or pulling out the knob 27. The face of the knob 27 conveniently bears the legend "Rough Sea—Push; Calm Sea —Pull," as shown in Fig. 5. When the spindle 26 is pushed inwardly, to bring the surface 224 into operative relationship with the cam-follower 21 of the lever 20, the panes 15, 16 are set at a smaller dihedral angle, giving a shorter range, than when the knob 27 is pulled out to bring the cam-surface 223 under the cam-follower 21, for calm sea conditions.

When the target is inclined to the line of attack, so as to appear foreshortened, the setting of the panes 15, 16 must be modified in proportion to the angle of such inclination. This adjustment is obtained by rotating the knob 27 until it assumes an attitude roughly corresponding to that presented by the target, the consequent rotation of the spindle 26 having the effect of moving the cam 22 bodily from the datum position either to the right or to the left, which movement is communicated through the lever 20 to the panes 15, 16.

The speed of the projectile will be affected by the relative ground speed of the aircraft from which it is discharged. The dihedral angle between the panes 15, 16 is accordingly increased proportionately as the aircraft ground speed is increased, thus preserving the optimum velocity/range ratio for the projectile, by adjusting the position of the lever 29 which varies the angular position about its axis of the eccentric sleeve 28. Such variation is effective to modify the position of the cam 22 to either side of the datum position. As will be seen from Fig. 5, the face-plate 31 bears a series of speed markings, graduated around its left-hand edge, in relation to which markings the lever 29 is set.

Where, in the case of an attack upon a target moving across the line of attack, it is possible for the observer to estimate the speed of the target, he may, by rotating the whole instrument upon its support 13, adjust the apparatus according to the requisite degree of lay-off to port or starboard. A wing-nut 32 is provided for fixing the instrument at the requisite lay-off position.

The reference numeral 33 indicates a smoked-glass screen which may be raised to and fixed in the position shown in chain-dotted lines in Figs. 4 and 5, to prevent dazzle when flying towards the sun, the nut 34 being provided to fix the screen 33 in the required position.

The apparatus provided by the invention is characterised by a considerable degree of tolerance. For example, its accuracy is not seriously affected by the position of the observer's head in relation to the panes 15, 16 in a fore-and-aft direction, since the extent of his head movement in that direction is infinitesimal in comparison with the range distance. Side to side movements of the observer's head make no difference whatever, so long as he is able to retain his master-eye view of the extremities of the target through the panes 15, 16.

The source of light required to provide the reflections in the panes 15, 16, which the observer must align with the extremities of the target when using the instrument, is conveniently provided by a small electric pea-lamp fitted to a harness or frame fixed to the observer's helmet in a position immediately above his master-eye, and the resultant reflections take the form of a spot seen in each pane. Since, however, the observer may experience some difficulty in adjusting the vertical elevation of the spots of light to coincide with the extremity of the target as seen through the panes 15, 16, with corresponding uncertainty as to the precise instant at which coincidence of length of target with the distance between the spots occurs, it is desirable to provide an improved transparent reflecting screen for the panes 15, 16 whereby the reflection of the source of light appears, not as a single spot, but as a line of light across the pane, so that the two lines of light appearing in both panes may serve as the limits of a frame by which the view of the target is outlined.

It is found that when a transparent reflecting screen is polished in such a manner as to produce a very large number of closely pitched parallel lines on its surface the reflection from a single point of light is seen as a line, and the faces of the transparent reflecting screens forming the panes 15, 16 are accordingly polished with a uniform rectilinear motion in such a manner as to produce a line of light in place of the aforesaid single spot. To produce a vertical line the direction of motion in polishing is horizontal.

The bracket 10 may be adjusted upon its spherical mounting 11, 12 so that the principal reflections of the source of light from the mean planes of the panes 15, 16 do not enter the observer's eye, the resultant lines alone being visible. In this manner a frame is produced which, without distracting the attention of the observer, accurately outlines and defines the position of the extremities of the target at the required range.

It will be evident that the apparatus is equally suitable for the ranging of targets which are more conveniently defined by a vertical than by a horizontal dimension, for, if the apparatus be so disposed that the pivot-axes of the panes 15, 16 be horizontal instead of vertical, and the polishing motion be carried out in a vertical direction, twin horizontal lines will appear to which all the adjustments previously described may be applied with a view to altering the vertical distance between them in such a manner as to define the required range. This arrangement has the additional advantage that it is possible to omit the adjustment of the transparent reflecting screens to allow for an angular approach to the target, since the extreme dimension of an object, such as a funnel or a mast of a ship, is unchanged by foreshortening at oblique angles of attack.

What I claim as my invention and desire to secure by Letters Patent is:

1. An instrument for use on an aircraft approaching a target for indicating the optimum target range at which a torpedo should be fired comprising two transparent reflecting screens through which an observer views the extremities of the target, said screens being mounted side by side and capable of individual pivotal movement in unison about parallel axes but in opposite directions, means for operating said screens so as to adjust the dihedral angle between them to a value supplemental to the known angle which is subtended at a given range at the observer's eye by an object of known dimension, and means for varying said dihedral angle to take into account the ground speed of the aircraft, the inclination of the target relative to the line of sight and the condition of the sea, whereby light from a source adjacent the eye of the observer is reflected by said screens to provide marks which come into coincidence with the extremities of the target as viewed through said screens when said optimum range is reached.

2. An instrument as claimed in claim 1 wherein said screens consist of optically flat glass panes, and comprise means constraining the panes to pivot simultaneously in opposite directions to the same extent, spring means resiliently urging both panes toward a datum position, and a series of independently operable cams associated with one of said panes in such manner that any one thereof may be actuated to adjust the panes in relation to said datum position.

3. An instrument as claimed in claim 1 comprising means constraining said screens to pivot simultaneously in opposite directions to the same extent, a series of independently operable cams associated with one of said screens in such manner that any one thereof may be actuated to adjust the dihedral angle between said screens, a setting member associated with each of said cams, and scales respectively registering the positions of said setting members in accordance with the desired adjustments of said angle.

4. An instrument as claimed in claim 1 comprising a frame on which said screens are pivotally mounted, means constraining said screens to pivot simultaneously in opposite directions to the same extent, a spindle rotatable in said frame and provided with an eccentric sheave-portion, an eccentrically bored sleeve rotatable on said sheave-portion, a cam rotatable on said eccentric sleeve, separate means for rotating said spindle, sleeve and cam individually, and a cam follower cooperating with said cam and connected with one of said screens whereby the rotation of any one of said spindle, sleeve and cam produces a pivotal movement of said screens to adjust the dihedral angle between them.

5. An instrument as claimed in claim 1 comprising a frame on which said screens are pivotally mounted, means constraining said screens to pivot simultaneously in opposite directions to the same extent, a spindle rotatable in said frame and provided with an eccentric sheave-portion, an eccentrically bored sleeve rotatable on said sheave-portion, a cam rotatable on said eccentric sleeve, separate means for rotating said spindle, sleeve and cam individually, a cam follower cooperating with said cam and connected with one of said screens whereby rotation of any one of said spindle, sleeve and cam produces a pivotal movement of said screens to adjust the dihedral angle between them, said cam being provided with axially spaced working faces, and means for moving the cam axially relative to the spindle and sleeve so as to select a desired cam face for cooperation with said follower.

6. An instrument as claimed in claim 1 comprising means for rotatably mounting the instrument as a whole about a vertical axis to effect adjustment for lay-off.

7. An instrument as claimed in claim 1 having screens polished with a uniform rectilinear motion whereby the reflection of the light source appears as a line across the screen.

BARNES NEVILLE WALLIS.